United States Patent [19]

Komatsu et al.

[11] Patent Number: 4,742,767

[45] Date of Patent: May 10, 1988

[54] COFFEE MAKER

[75] Inventors: Morimasa Komatsu; Atuhiko Ono, both of Ichinomiya; Hisayoshi Uchida, Iwakura, all of Japan

[73] Assignee: Kabushiki Kaisha Toshiba, Kawasaki, Japan

[21] Appl. No.: 925,104

[22] Filed: Oct. 30, 1986

[30] Foreign Application Priority Data

Nov. 5, 1985 [JP] Japan .............................. 60-247546
Nov. 6, 1985 [JP] Japan .............................. 60-249519

[51] Int. Cl.[4] ...................... A47J 31/043; A47J 31/42
[52] U.S. Cl. ......................................... 99/280; 99/286
[58] Field of Search .................. 99/279, 280, 283, 284, 99/286, 287, 289 R, 290, 292, 281, 282; 426/433

[56] References Cited

U.S. PATENT DOCUMENTS 1,203,661 11/1916 Task ..................................... 99/292
1,232,808  7/1917 Kalilna ................................. 99/292
2,119,455  5/1938 Ayala .................................... 99/280

OTHER PUBLICATIONS

Coffee Inquiry, p. 127—Author; Hroshi Itou, Publication Date; Mar. 10, 1973.

Primary Examiner—Robert W. Jenkins
Attorney, Agent, or Firm—Cushman, Darby & Cushman

[57] ABSTRACT

A coffee maker has a heater plate integrally formed with a base plate. The coffee maker also has a lower container in which water is stored and an upper container in which ground coffee is stored. The upper container is mounted on the lower container for a fluid communication therebetween. The lower and upper containers may be moved by a supporting member from a first position where the lower container is heated by the heater plate to a second position where the lower container is allowed to cool when the water in the lower container passes to the upper container. A heater attached to the heater plate is deenergized when the upper and lower containers are moved to the second position.

9 Claims, 7 Drawing Sheets

COFFEE MAKER

BACKGROUND OF THE INVENTION

1. Field of the Invention

The present invention relates, in general, to coffee makers. More specifically, the invention relates to a coffee maker of the so called syphon-type, which includes a lower receptacle containing water and an upper receptacle containing ground coffee. The upper receptacle is arranged on the lower receptacle for fluid communication therebetween.

2. Description of the Prior Art

Figure 1:
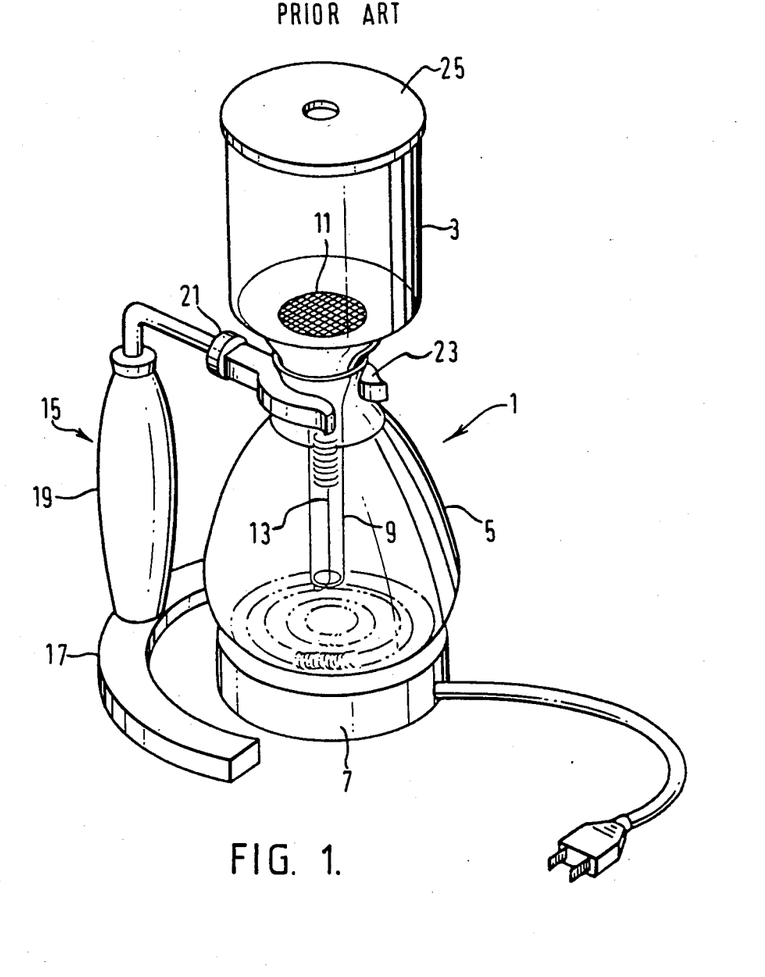
FIG. 1 is a perspective view illustrating a conventional coffee maker.

Syphon-type coffee makers, as shown in FIG. 1, have been used widely, in particular, among frequent coffee drinkers. A typical syphon-type coffee maker 1 includes upper and lower receptacles 3 and 5 and heater 7. A water conducting tube 9 projects outward from the bottom surface of upper receptacle 3. A filter 11 is detachably arranged on the bottom of upper receptacle 3 by a coil-spring 13 positioned in water conducting tube 9. One end of coil-spring 13 is fixed to the center of filter 11 and the other end thereof is hooked at the edge of water conducting tube 9. A supporting member 15 includes an arc-shaped pedestal 17, a handle portion 19 extending perpendicularly from the center of pedestal 17 and a holding member 21 extending at a right angle from the top of handle portion 19. A U-shaped grip member 23 is formed at the top of holding member 21 to grip lower receptacle 5 by its U-shaped portion. A lid 25 is detachably arranged on the opening of upper receptacle 3.

When using the above-described coffee maker, ground coffee is put into upper receptacle 3 and a proper amount of water corresponding to the amount of coffee is stored in lower receptacle 5. Upper receptacle 3 is firmly fixed on lower receptacle 5 so that it communicates with the interior of lower receptacle 5 through water conducting tube 9 and filter 11. The upper and lower receptacles 3 and 5 are supported by supporting member 15, and heater 7 is positioned under lower receptacle 5 to heat the water in lower receptacle 5. When the water is boiled by heater 7, the vapor pressure in lower receptacle 5 rises gradually due to an increase in vapor within lower receptacle 5. The boiled water in lower receptacle 5 is transferred to upper receptacle 3 by the increased vapor pressure through water conducting tube 9 when the vapor pressure in lower receptacle 5 exceeds a prescribed value. Therefore, the groung coffee in upper receptacle 3 is mixed with the boiled water. After that, heater 7 is removed from the position under lower receptacle 5, and lower receptacle 5 cools. Consequently, the vapor pressure in lower receptacle 5 falls, thus producing a partial vacuum in lower receptacle 5. The partial vacuum causes the coffee liquid mixture in upper receptacle 3 to pass from upper receptacle 3 into lower receptacle 5 through filter 11 and water conducting tube 9.

In this conventional coffee maker, since heater 7 is separated from the other components, users have to handle heater 7 and the other components separately when using the coffee maker, causing inconvenience. Furthermore, the heater 7 may become lost or misplaced, unless stored with the other components.

To solve the problems described above, the separate heater 7 may be integrally mounted on a base member. However, if the separate heater 7 is integrally mounted on the base member, as described above, it is difficult to rapidly cool lower receptacle 5 after the water in lower receptacle 5 passes to upper receptacle 3. This is because heater 7 cannot be moved from the position under lower receptacle 5. Even though the power supplied to heater 7 is cut off, residual heat is still radiated from heater 7 for a certain period of time. Thus, lower receptacle 5 does not cool quickly. As a result, the coffee liquid in upper receptacle 3 is not quickly transferred into lower receptacle 5, thus causing deterioration of the quality of the resulting coffee.

SUMMARY OF THE INVENTION

It is an object of the invention to integrate a heater with the other base components of a syphon-type coffee maker and to allow rapid cooling of the heated coffee extracting container.

It is a further object of the invention to automatically remove a coffee extracting container from an associated heater upon attainment of a predetermined temperature.

According to the present invention, a rotatable holding member pivoted on a base member supports a coffee liquid extracting container including upper and lower containers. The coffee liquid extracting container may be moved by the holding member between a first position where the coffee liquid extracting container is heated by the heater and a second position where the coffee liquid extracting container is separated from the heater for cooling. Preferably, a shape memory alloy is employed as a moving member to automatically move the coffee liquid extracting container to the second position in association with the holding member after the water in lower container heated by the heater is transferred from the lower container to the upper container in response to a predetermined temperature of the heater.

BRIEF DESCRIPTION OF THE DRAWINGS

The present invention is best understood with reference to accompanying drawings in which.

DETAILED DESCRIPTION OF THE PREFERRED EXEMPLARY EMBODIMENTS

Figure 2:
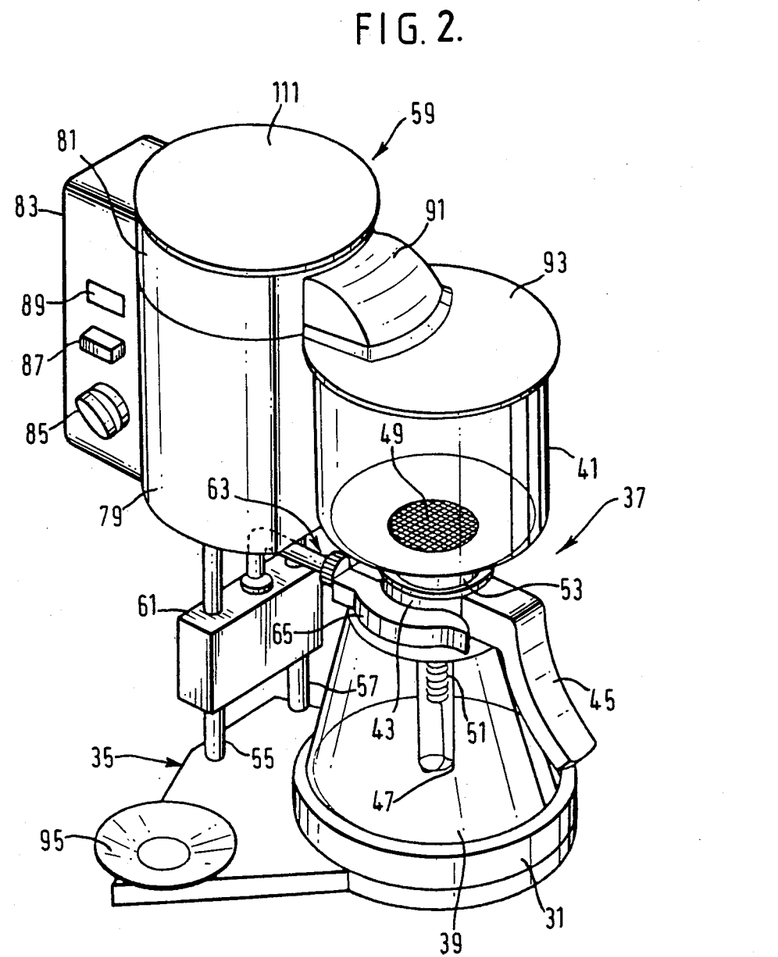
FIG. 2 is a perspective view illustrating an exemplary embodiment of the present invention.
Figure 3:
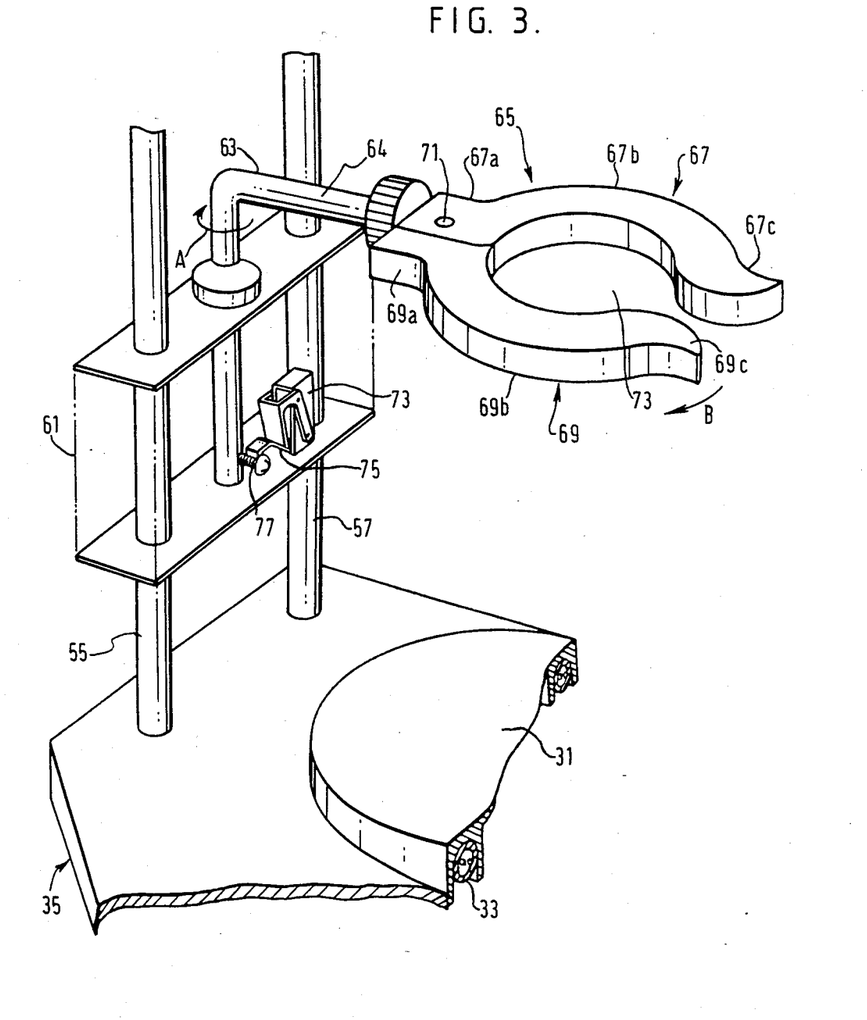
FIG. 3 is an enlarged perspective view, partly broken away, illustrating a holding member and a switch arrangement used in one embodiment as shown in FIG. 2.

The preferred exemplary embodiments of the present invention will now be described in more detail with reference to the accompanying drawings. In FIG. 2, a disc-shaped heater plate 31, in which a sheath heater 33 is provided along the circumferential wall thereof as shown in FIG. 3, is integrally mounted on a base plate 35. A coffee liquid extracting container 37 is placed on the surface of heater plate 31. Coffee liquid extracting container 37 includes lower and upper containers 39 and 41 respectively. These containers 39 and 41 preferably are made of heat-resistant glass material. Lower container 39 is formed such that its diameter gradually increases from the opening toward the bottom thereof. A thin metal band 43 is wrapped around the wall surface in the vicinity of the opening, and a handle 45 is attached thereto.

As can be seen in FIG. 2, a water conducting tube 47 projects outward from the center of the bottom of upper container 41. A filter 49 is movably fixed on the bottom of upper container 41 by a spring 51 arranged in water conducting tube 47. One end of spring 51 is fixed to filter 49, and the other end thereof is hooked at the edge of water conducting tube 47 so that filter 49 is forcibly pressed onto the bottom surface of upper container 41. A ring-shaped rubber packing 53 is fixed to the connecting portion between the bottom surface of upper container 41 and water conducting tube 47. When upper container 41 is mounted on lower container 39, rubber packing 53 is tightly fitted into the opening of lower container 39, and the interior of lower container 39 is in fluid communication with the interior of upper container 41 through water conducting tube 47 and filter 49.

In the illustrated embodiment, a pair of parallel poles 55 and 57 project upward from base plate 35 to support a mill mechanism 59. A supporting case 61, arranged between base plate 35 and mill mechanism 59, is supported by poles 55 and 57. An L-shaped rotatable supporting arm 63 is arranged between poles 55 and 57. One end 64 of supporting arm 63 extends into supporting case 61 and is movably fixed to the bottom plate of supporting case 61, as shown in FIG. 3. Thus, supporting arm 63 can be moved in the direction indicated by arrow A. The middle portion of supporting arm 63 is bent at a right angle, and extends generally toward heater plate 31. A holding member 65 is fixed to the other end of supporting arm 63 to support coffee liquid extracting container 37 on heater plate 31.

As shown in FIG. 3, holding member 65 includes a first and second holding arms 67 and 69. First holding arm 67 is preferably formed as a single element including a base plate portion 67a, a concave plate portion 67b and a convex plate portion 67c.

Also, second holding arm 69 includes a base plate portion 69a, a concave plate portion 69b and a convex plate portion 69c. Base portion 69a of second holding arm 69 is movably connected to base portion 67a of first holding arm 67 by a pin 71, and urged toward first holding arm 67 by a spring (not shown) to establish a holding space 73 surrounded by concave plate portions 67b and 69b. Thus, second holding arm 69 can be moved in the direction of arrow B against the spring when convex plate portion 79c of second holding arm 69 is pressed outwardly. When coffee liquid extracting container 37 is held by holding member 65, initially, the inner surfaces of convex plate portions 67c and 69c are pressed outward by the outer wall of lower container 39. Second holding arm 69 is rotated around pin 71 in the direction of arrow B against the tensile force of the spring (not shown). Second holding arm 69 is further rotated when coffee liquid extracting container 37 is moved further toward holding space 73 of holding member 65, and coffee liquid extracting container 37 is finally moved into holding space 73 of holding member 65. The outer wall of lower container 39 is firmly gripped by first and second holding arms 67 and 69 under the tensile force of the spring. Therefore, coffee liquid extracting container 37 is supported and held firmly on heater plate 31 by holding member 65, as shown in FIG. 2.

As can be seen in FIG. 3, a microswitch 73 for controlling the voltage supply to sheath heater 33 of heater plate 31 is fixed on the bottom plate of supporting case 61. An actuator 75 of switch 73 is pressed by a projecting member 77, such as a screw projecting from supporting arm 63, when coffee liquid extracting container 37 is supported on heater plate 31 (first position). Therefore, the voltage is supplied to sheath heater 33 to heat water in lower container 39 of coffee liquid extracting container 37. Actuator 75 of switch 75 is released when coffee liquid extracting container 37 is moved to a position apart from heater plate 31 (second position), by rotating holding arm 69 in the direction of B. Therefore, the voltage supplied to sheath heater 33 is automatically cut off, and coffee liquid extracting container 37 is allowed to cool.

In FIG. 2, mill mechanism 59 is supported by poles 55 and 57, as described above. Mill mechanism 59 includes a cylindrical motor case 79, in which a motor (not shown) is housed, a mill case 81 mounted on motor case 79 and an operation box 83 attached to the side wall of motor case 79. A timer knob 85, a start button 87 and an indicator 89 (pilot lamp) are arranged on the side wall of operation box 83. A ground coffee guide 91 is formed at the side wall of mill case 81 to guide ground coffee discharged from mill case 81 to upper container 41 of coffee liquid extracting container 37. A lid 93 for covering the opening of upper container 41 is intergrally formed on the edge of ground coffee guide 91.

A tray 95 may be fixed on base plate 35 at the second position where coffee liquid extracting container 37 is positioned when supporting arm 63 is rotated in the direction of arrow B.

Figure 4:
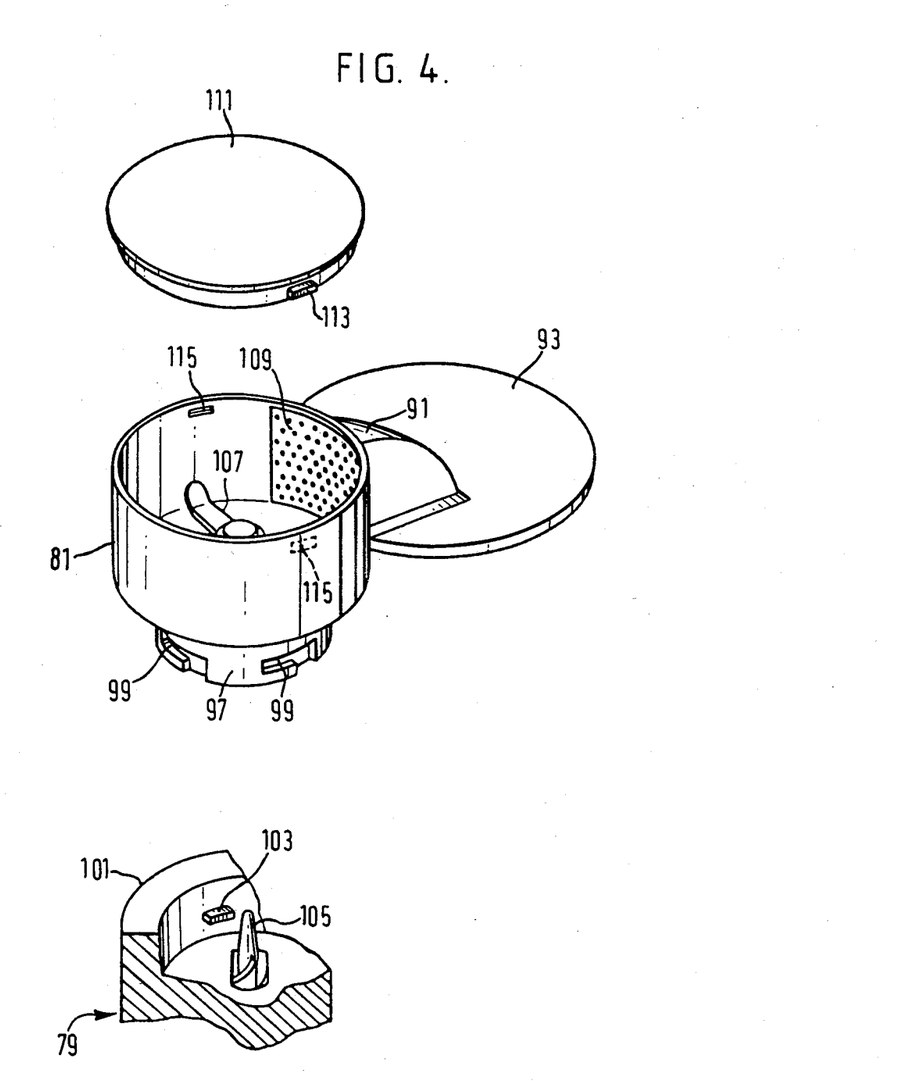
FIG. 4 is an exploded view illustrating a mill mechanism shown in FIG. 2.

As can be seen more detail in FIG. 4, a cylindrical connecting portion 97, whose diameter is smaller than that of mill case 81, projects from the bottom surface of mill case 81. A plurality of inverted L-shaped grooves 99 are formed at the circumferential surface of cylindrical connecting portion 97.

A circumferential wall 101 is formed on the top portion of motor case 79. A plurality of connecting pieces 103 to be inserted into the individual grooves 99 of cylindrical connecting portion 97 project inward from the inner wall of circumferential wall 101 of motor mill 79 to fix mill case 81 on motor case 79 when mill case 81 is mounted on motor case 79. A coupling shaft 105 mechanically connected to the motor shaft (not shown) rotatably projects from motor case 79, as shown in FIG. 4.

In mill case 81, a cutting blade 107 for grinding coffee beans in mill case 81 is rotatably fixed at the center of the bottom of mill case 81. Cutting blade 107 can be coupled with coupling shaft 105 when mill case 81 is mounted on motor case 79, so that cutting blade 107 is driven by the motor through coupling shaft 105. A filter 109 is attached to the inner wall of mill case 81 over the opening of ground coffee guide 91. Therefore, the ground coffee from cutting blade 107 is fed to upper container 41 of coffee liquid extracting container 37 through filter 109 and ground coffee guide 91.

A lid 111 is detachably provided on the opening of mill case 81 by elastically coupling a pair of projections 113 projecting outwardly from the side wall of lid 111 with a corresponding pair of depressions 115 provided on the inner wall of mill case 81.

The operation of the coffee maker described above will now be described hereinafter. First, lid 111 is opened, and desired amount of coffee beans are supplied into mill case 81. Coffee liquid extracting container 37 is set as shown in FIG. 2 after a proper amount of water corresponding to the amount of coffee beans is stored in lower container 39. Indicator 89 is turned on and the motor (not shown) is energized when the timer is set by rotating timer knob 85, and start button 87 is pressed. Cutting blade 107 in mill case 81 is rotated by the motor through coupling 105, and grinds the coffee beans into ground coffee. The ground coffee is similtaneously transferred into upper container 41 through filter 109 and ground coffee guide 91.

A predetermined time after the milling operation is executed, the motor is stopped, and heater 31 is energized by the timer (not shown). Water in lower container 39 is heated and subsequently boils. The boiled water causes the vapor pressure in lower container 39 to rise gradually. Finally, when the vapor pressure in lower container 39 reaches a prescribed value, the water in lower container 39 rapidly moves up to upper container 41 through water conducting tube 47 and filter 49 because of the increasing vapor pressure in lower container 39. Therefore, the water is mixed with the ground coffee in upper container 41, thus resulting in a coffee liquid mixture.

Figure 5:
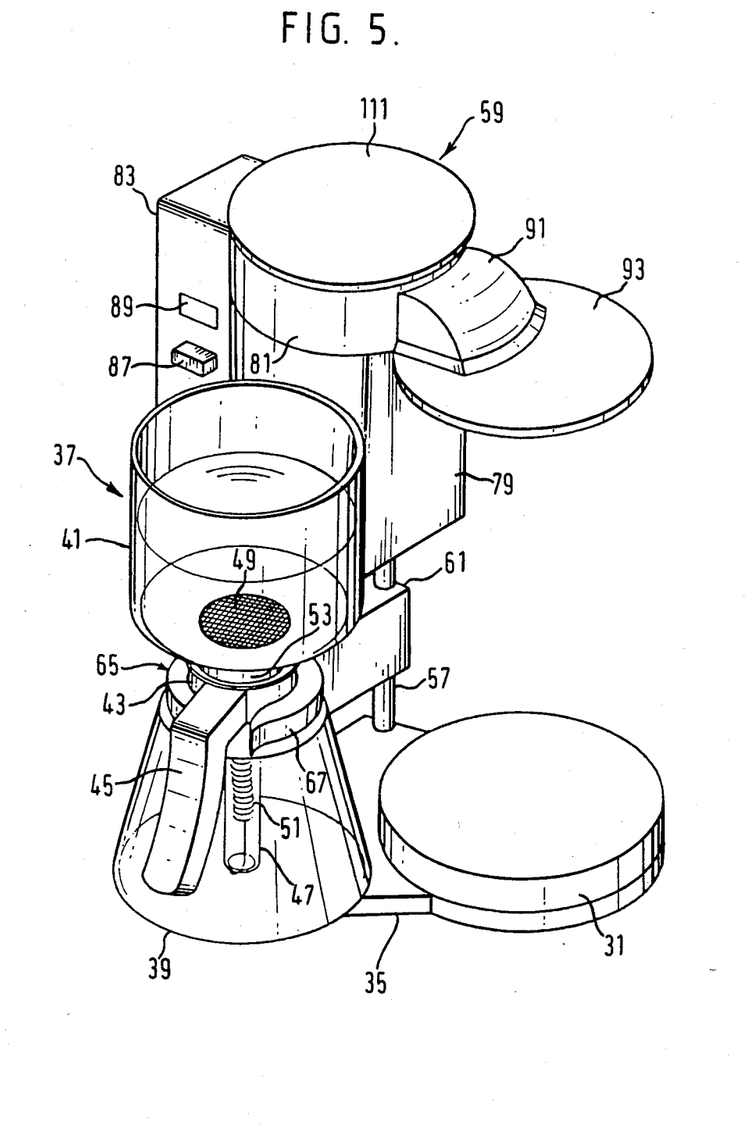
FIG. 5 is a perspective view illustrating the coffee maker, shown in FIG. 2, in the state where a coffee liquid extracting container is moved to the second position.

In this embodiment, since coffee liquid extracting container 37 including upper and lower containers 41 and 39 may be moved by rotating supporting arm 63 from the first position where coffee liquid extracting container 37 is heated to the second position where coffee liquid extracting container 37 is allowed to cool, the user can move coffee liquid extracting container 37 from the first position to the second position several seconds after the water passes to upper container 41, as shown in FIG. 5. As lower container 39 cools, and the vapor pressure in lower container 39 decreases, a partial vacuum occurs in lower container 39. The partial vacuum within lower container 41 causes the coffee liquid mixture in upper container 41 to move down from upper container 41 to lower container 39 through filter 49 and water conducting tube 47, thus storing the coffee liquid in lower container 39.

At this time, in this embodiment, since actuator 75 of switch 73, as shown in FIG. 3, is disengaged from projecting member 77 of supporting arm 63 when supporting arm 63 is rotated in the direction of arrow A, heater 33 is deenergized. Therefore, heater plate 31 cools rapidly, and the danger from exposed heater plate 31 is reduced since it is automatically deenergized when coffee liquid extracting container 37 is moved from the first position to the second position.

Figure 6:
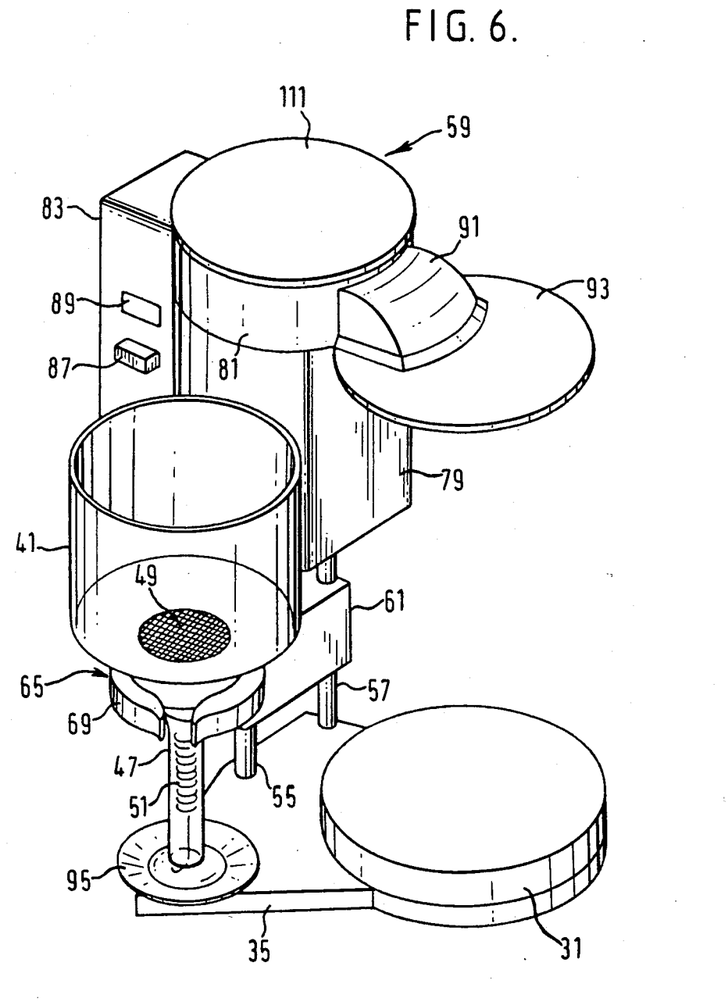
FIG. 6 is a perspective view of the coffee maker, shown in FIG. 5, in the state where only an upper container is supported by the holding member.

Furthermore, as shown in FIG. 6, upper container 41 may be held by holding member 65 in the second position after upper container 41 is removed from lower container 39. In this state, since tray 95 is provided at the second position on base plate 35, a drops of coffee liquid from upper container 41 are collected by tray 95.

Another embodiment of the present invention will be described by referring to FIG. 7. In this embodiment, one end of supporting arm 63 extends into the interior of base plate 35, and is fixed to one end portion 120 of a floating plate 117. One end 122 of a shape memory alloy coil 119 is fixed to the other end portion 124 of floating plate 117, and the other end 126 thereof is fixed to a portion 121 raised from a bottom plate 123 of base plate 35. One end 128 of a heat conducting plate 125 is integrally formed with heater plate 31, and the other end 130 thereof extends under shape memory alloy 119 to convey the heat from heater plate 31 to shape memory alloy 119. In this embodiment, shape memory alloy 119 is so designed that it contracts when it receives sufficient heat from heat conducting plate 125 to exceed a prescribed transformation temperature higher than the temperature at which the water in lower container 39 boils.

In the one embodiment as described before, coffee liquid extracting container 37 may be moved manually from the first position to the second position after the water in lower container 39 passes to upper container 41. In this embodiment, however, coffee liquid extracting container 37 can be moved automatically from the first position to the second position.

Figure 7:
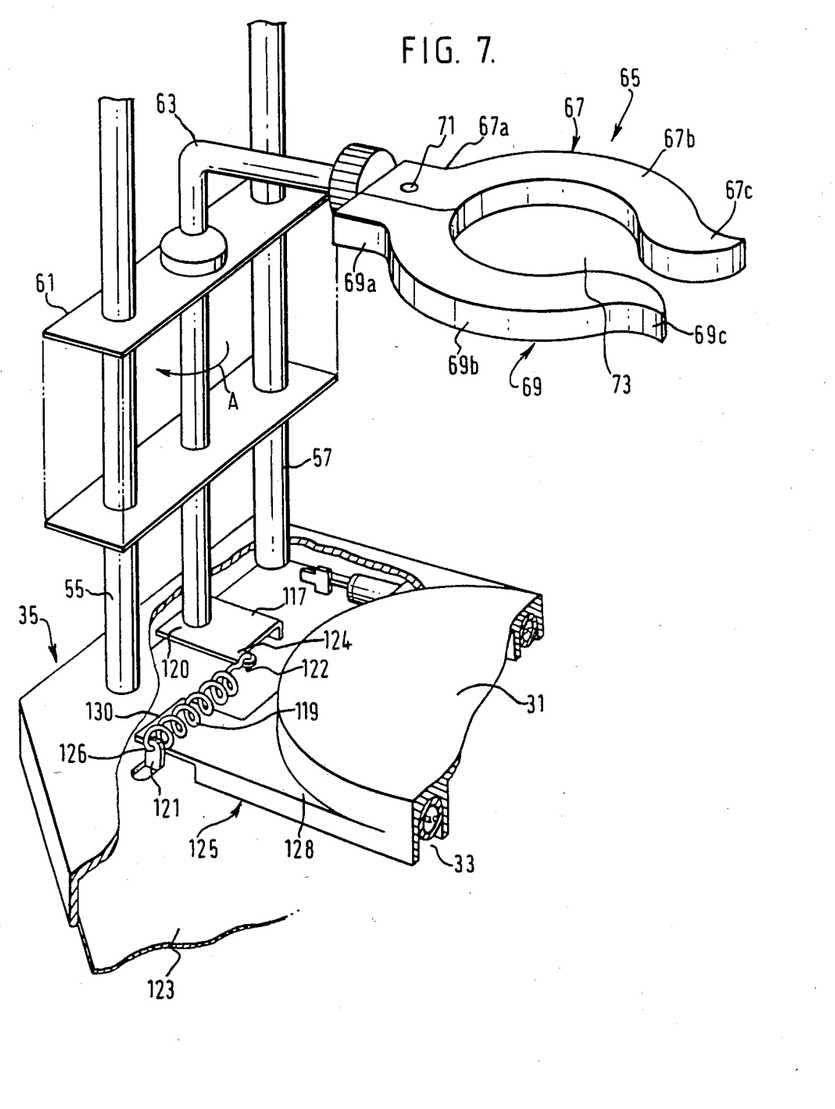
FIG. 7 is an enlarged perspective view, partly broken away, illustrating another embodiment of the present invention.

In FIG. 7, the temperature of heat conducting plate 125 quickly rises after all the water in lower container 39 moves up to upper container 41. Then, shape memory alloy 119 quickly contracts immediately after the temperature of heat conducting plate 125 exceeds the prescribed transformation temperature. Supporting arm 63 is forcibly rotated in the direction of arrow A by the contracting force of shape memory alloy 119 through floating plate 117. As a result, coffee liquid extracting container 37 is automatically moved from the first position to the second position by the rotation of supporting arm 63.

According to this embodiment, since coffee liquid extracting container 37 can be moved automatically from the first position to the second position after the water in lower container 39 is transferred from lower container 39 to upper container 41, no inconvenient manual operation is needed. Furthermore, since the timing of the movement of the coffee liquid extracting container is predetermined by the transformation temperature of shape memory alloy, a more uniform quality coffee may be consistently obtained.

In this embodiment, the moving means is not limited only to shape memory alloys. For example, a combination of a heat sensitive element and a motor or electromagnet could be used.

The heat sensitive element detects the rapid temperature rise of the heater plate corresponding to the transfer of the water from the lower container, and the motor or electromagnet moves the supporting arm and coffee liquid extracting container from the first position to the second position in response to the detection of this temperature rise.

In summary, it will be seen that the present invention overcomes the disadvantages of the prior art and provides an improved syphon type coffee maker, in which the heater plate is integrally formed with the base plate, and which may move the coffee extracting container from a first position where the coffee liquid extracting container is heated to a second position where coffee liquid extracting container is separated from the heater plate for cooling.

Many changes and modifications in the above-described embodiments can thus be carried out without departing from the scope of the present invention. Therefore, the appended claims should be construed to include all such modifications.

What is claimed is:

1. A coffee maker comprising:

coffee liquid extracting container means for containing water and ground coffee;

base member means including a heater means for heating the water in the coffee liquid extracting container means and a tray means adjacent said heater means; and holding member means for supporting the coffee liquid extracting container means, and for moving the coffee liquid extracting container means between a first position wherein the coffee liquid extracting container means is in contact with the heater means to a second position wherein the coffee liquid extracting container means is in contact with the tray means.

2. An apparatus according to claim 1 wherein the coffee liquid extracting container means includes a removable lower container for receiving the water and an upper container for receiving the ground coffee, the upper container being mounted on the lower container for a fluid communication therebetween.

3. An apparatus according to claim 2, wherein the tray means receives drips from the upper container when the upper container is in the second position, and the lower container is removed.

4. An apparatus according to claim 2, further comprising milling means for milling coffee beans into ground coffee, and for feeding the ground coffee to the upper container when the coffee liquid extracting container means is positioned at the first position.

5. An apparatus according to claim 2 wherein the holding member means comprises a pair of holding arm means including individual base portions and contracting force means for firmly supporting the lower container of the coffee liquid extracting container means, each base portion of the holding arm means being movably connected to one another and the contracting force means being extended between the each base portion of the holding arm means.

6. An apparatus according to claim 1, further including switch means for deactivating the heater means when the coffee liquid extracting container means is moved from the first position to the second position.

7. An apparatus according to claim 1 wherein the holding member means is rotatable and includes means for automatically moving the coffee liquid extracting container means to the second position in response to a predetermined temperature of the heating means.

8. An apparatus according to claim 7, further including switch means for deactivating the heater means when the coffee liquid extracting container means is moved from the first position to the second position.

9. An apparatus according to claim 7, wherein the moving means includes a shape memory alloy.

* * * * *